A. B. WEISSENBORN.
LOOM.
APPLICATION FILED NOV. 1, 1909.

978,248.

Patented Dec. 13, 1910.
7 SHEETS—SHEET 3.

WITNESSES
INVENTOR.
Albert B. Weissenborn,
By Benedict, Morsell & Caldwell
ATTORNEYS.

A. B. WEISSENBORN.
LOOM.
APPLICATION FILED NOV. 1, 1909.

978,248.

Patented Dec. 13, 1910.
7 SHEETS—SHEET 4.

WITNESSES.

INVENTOR.
Albert B. Weissenborn
By Benedict, Morsell & Caldwell
ATTORNEYS.

UNITED STATES PATENT OFFICE.

ALBERT B. WEISSENBORN, OF APPLETON, WISCONSIN.

LOOM.

978,248.

Specification of Letters Patent.

Patented Dec. 13, 1910.

Application filed November 1, 1909. Serial No. 525,618.

*To all whom it may concern:*

Be it known that I, ALBERT B. WEISSENBORN, residing in Appleton, in the county of Outagamie and State of Wisconsin, have invented new and useful Improvements in Looms, of which the following is a description, reference being had to the accompanying drawings, which are a part of this specification.

This invention has for its object to provide a loom of novel construction particularly adapted for weaving wire cloth, but capable of other weaving, and provided with automatic means carried with the lay for throwing the shuttle back and forth at the proper time.

Another object is to provide a means for reversing the position of the bobbin in the shuttle when it reaches the shuttle boxes.

Another object is to provide automatic means for taking up the slack in the weft wire before it is struck by the reed.

Another object is to provide a swinging shuttling board which is automatically moved into and out of position at the proper time.

Another object of the invention is to provide novel means for giving tension to the warp wires and for feeding the fabric to the cloth beam at intervals as the work progresses.

The invention consists in the construction and relative arrangement of certain parts, and in combinations of parts hereinafter particularly described and pointed out in the claims.

In the accompanying drawings I show an exemplifying structure embodying the invention, but it is to be understood that the invention is capable of embodiment in different forms.

In these drawings like characters of reference indicate the same parts in the different views.

In these drawings 10 indicates a loom frame having a warp beam 11, heddle frames 12 and 13, a swinging lay 14, a breast beam 15 and a cloth beam 16, all of usual construction except as hereinafter specifically mentioned.

The lay 14 may be swung by hand or any suitable power, means may be provided for the purpose and in the usual manner performs its functions of beating up the weft wire which has been left by the passage of the shuttle through the shed between the warp wires 17 formed by the shifting of the heddle frames 12 and 13. The lay, however, carries with it the mechanism for throwing the shuttle from side to side thereof, which mechanism is automatically operated when the lay is approaching the position of dwell, its rearmost position of its swinging movement, and is actuated by alternate engagement at the respective ends of the lay with parts movable with the heddles 12 and 13. In one position of the heddles the shuttle driving mechanism at one end of the lay is operated, while in the other position of the heddles the shuttle driving mechanism at the other end of the lay is operated.

Figure 1:
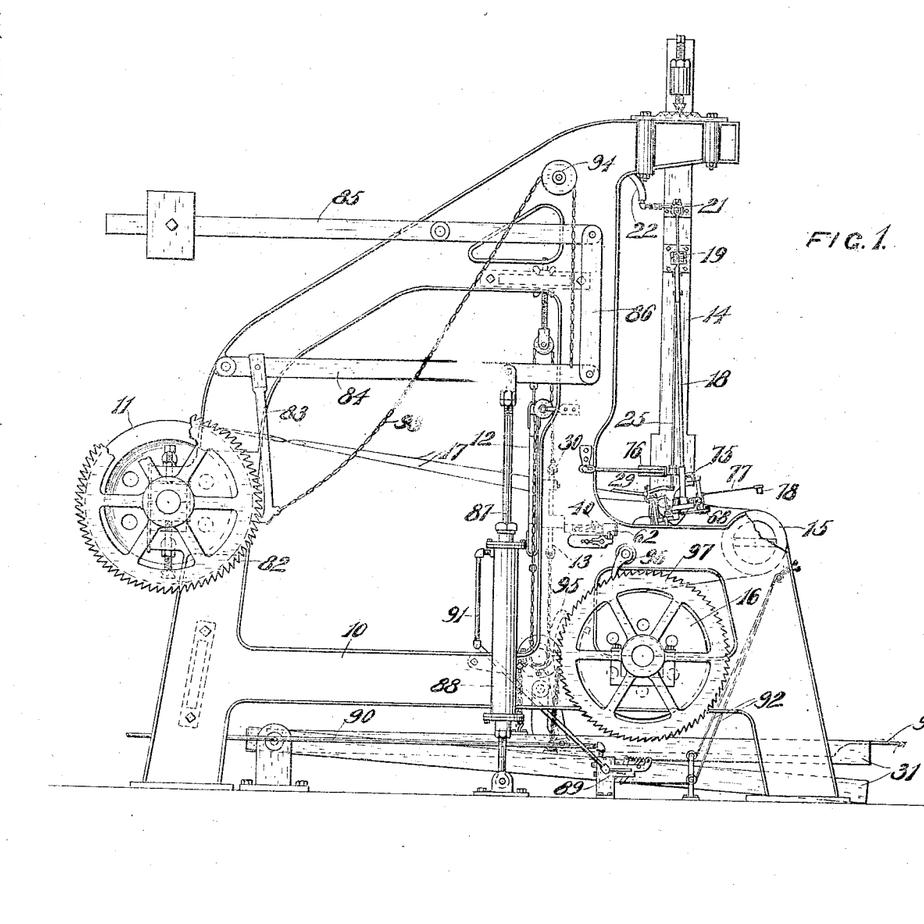
Figure 1 is a side elevation of a loom constructed in accordance with this invention.
Figure 2:
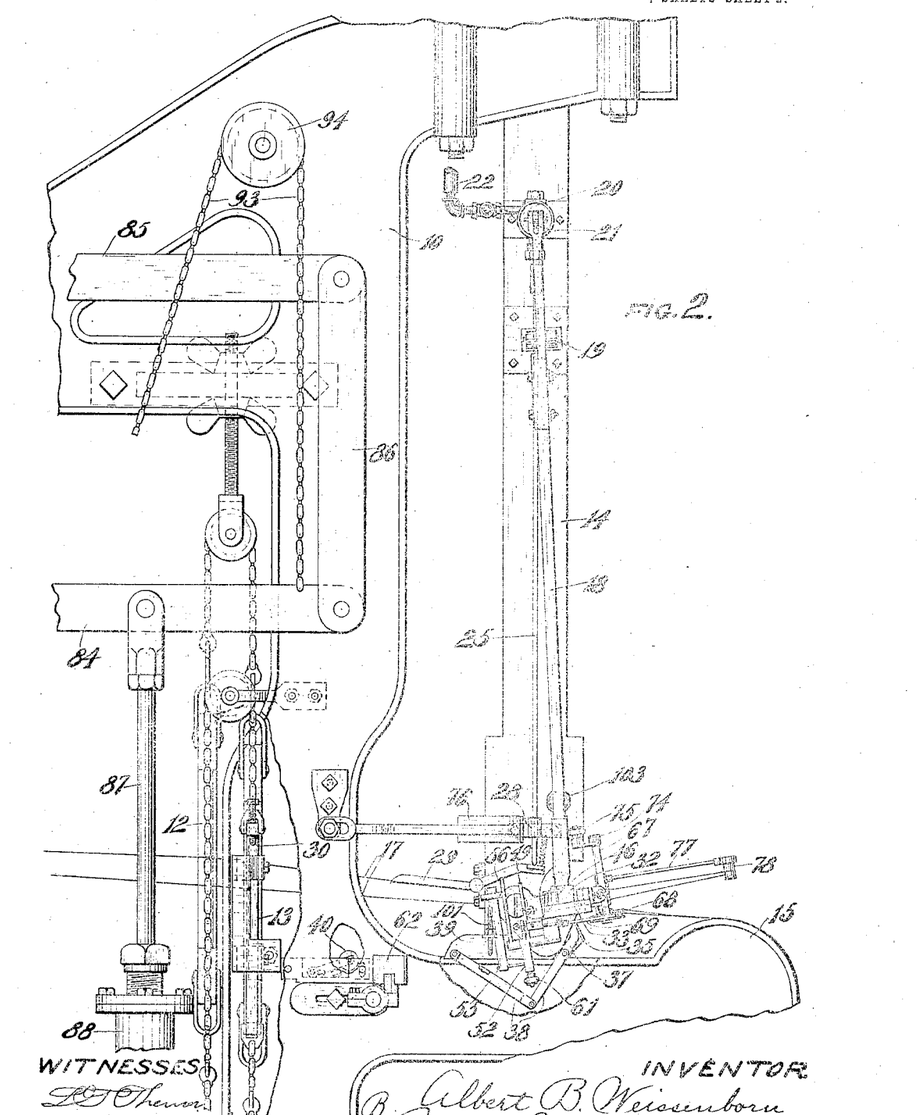
Fig. 2 is a similar view on an enlarged scale of a portion thereof, parts of the frame being broken away for clearness of illustration.
Figure 5:
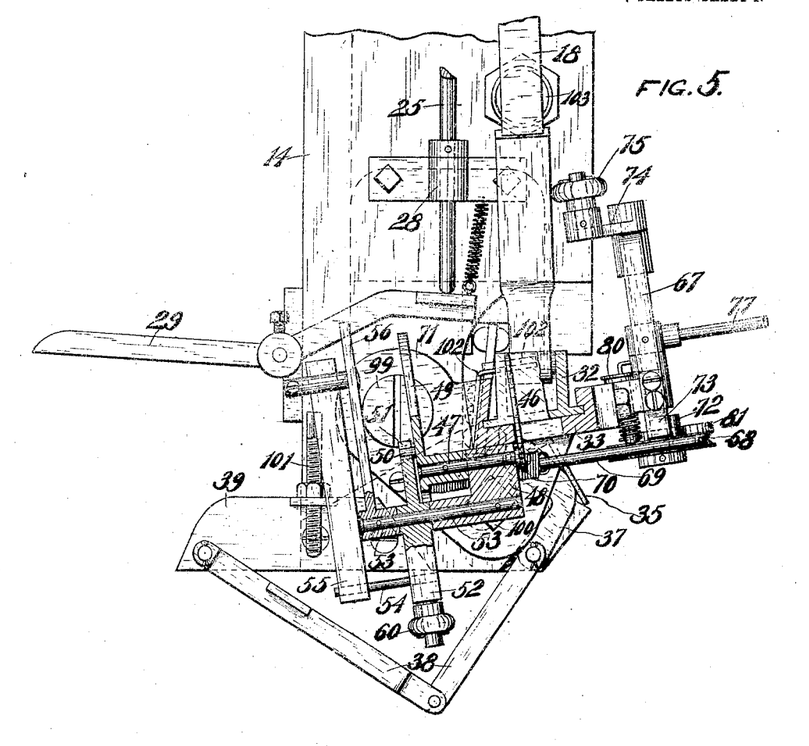
Fig. 5 is a view of one end of the lay with parts sectioned on the plane of line 5—5 of Fig. 8.
Figure 6:
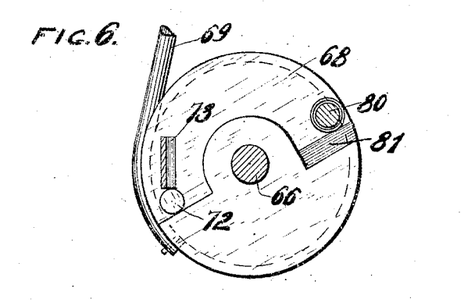
Fig. 6 is a detail plan view of parts of the weft wire take up.
Figure 10:
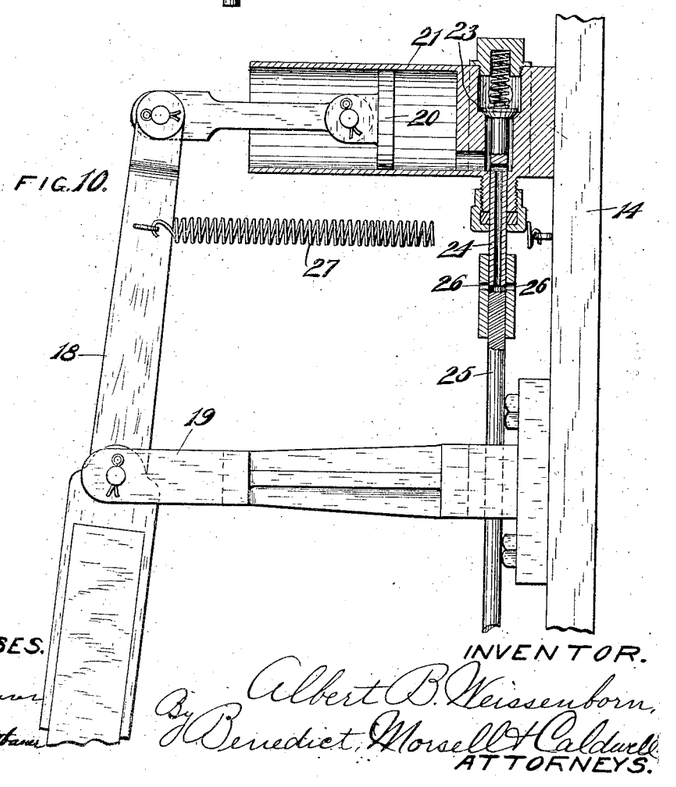

A picker stick 18 is pivotally connected at 19 to each end of the lay frame and at its upper end it is connected to a piston 20 working in a cylinder 21 where it is operated upon by compressed air or other pressure fluid admitted to the cylinder from a flexible supply pipe 22 by a spring seated supply valve 23, shown in Fig. 10. The valve 23 is mounted on the end of a tubular stem 24 which has its central opening in communication with the interior of the cylinder and its lower end fitting within the cup shaped upper end of a rod 25 where it communicates with the atmosphere through openings 26 in said cup shaped end to exhaust the contents of the cylinder. A coil spring 27 holds the picker stick in its outer position with the piston 20 at the inner end of the cylinder, but when the rod 25 is pushed upwardly it closes the exhaust from the cylinder by closing the lower end of the tubular stem 24 and also lifts the supply valve 23 to admit compressed air to the cylinder where it operates upon the piston 20 to throw the picker stick forcibly against the action of the spring 27. At its lower end the rod 25 passes through a guide cleat 28 and rests upon a spring retracted tripping arm 29 which is pivotally mounted on the lay and extends rearwardly to a position where it will engage an adjustable tripping pin 30 on one of a pair of slides 104 working in guides 105 on the sides of the loom frame, said slides being operated in unison with the heddle frames and from the same driving means. The slide 104 at one side of the loom works with one heddle frame and the slide at the other side of the loom works with the other heddle frame so that in one position of the heddle frames the lay has the tripping arm 29 at one end thereof depressed by its engagement with a tripping pin 30 to cause the lifting of the rod 25 and the consequent operation of the picker stick at that end, while in the other position of the heddle frames this condition prevails at the other end of the lay. The heddle frames are shifted in any desirable manner, the usual treadles 31 being shown in Fig. 1 for that purpose. At their lower ends the picker sticks 18 enter sockets or recesses formed in picker blocks 32 which are slidably mounted in shuttle boxes 33 carried by the lay at the ends of the shuttle race, the shuttle blocks being provided with side flanges riding in corresponding guide grooves in the shuttle box, as shown in Fig. 5.

The shuttle 34, which may be of any construction, so far as the shuttle driving mechanism is concerned, but which as here shown is of the construction covered by my copending application for Letters Patent Serial Number 501,481, filed June 11, 1909, is driven from the shuttlebox at one end of the lay, over the shuttling board to the shuttle box at the other end of the lay through the operation of the picker stick thereon, the picker block being forced by the picker stick against the end of the shuttle to give it sufficient momentum to carry it across the loom. The inward movement of the picker stick is limited by its engagement with a cushion post 103 located on the side of the lay, the picker stick being provided with a cushion 104' of rubber or other suitable material to engage therewith. Preferably the lay is swung by pneumatic means under electrical control such as covered by my United States Letters Patent No. 811,012 dated Jan. 30, 1906, but it may be swung by hand or by automatic means.

Figure 3:
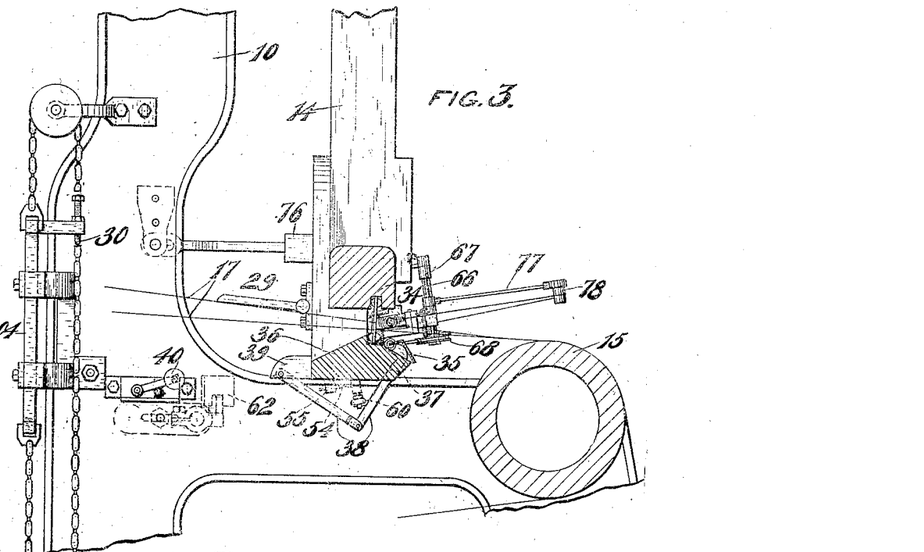
Fig. 3 is a similar view with the parts of the loom sectioned so as to show the distant side of the frame.

The shuttling board over which the shuttle travels is preferably capable of swinging into and out of its operative position automatically so as to be out of the way when the blow is struck by the reed of the lay. The shuttling board as here shown comprises an angle iron plate 35 hinged to the lay beam 36, Fig. 3, and extending from one shuttle box to the other with crank arms 37, Fig. 5, at its ends connected to toggle links 38 which are mounted on brackets 39 extending rearwardly from the lower ends of the sides of the lay. The rear members of these toggle links 38 are in position to engage yieldingly mounted rollers 40, Fig. 3, which are mounted on the inner face of the loom frame 15 so that when the lay approaches its position of dwell the toggle links 38 engage with the rollers 40 and swing the shuttling board 35 to its upper or operative position and hold it there during the dwell of the lay while the shuttle travels thereacross, though permitting the shuttling board to drop to the position shown in Fig. 3 as soon as the lay swings forward to free the toggle links from the rollers 40. In this manner the shuttling board is swung out of position when the lay strikes its blow so that wire is not struck by it.

A plate 71 which supports the shuttle box is pivotally mounted on the end of the lay and this is preferably done by means of a screw 99 which may be adjusted from either end, there being a set screw and slot 100 for clamping the plate in its adjustments. The shuttling board is given a corresponding adjustment to bring it level with the bottom of the shuttle box by means of a set screw 101 on bracket 39 which engages a stop on one of the toggle links 38.

Figure 9:
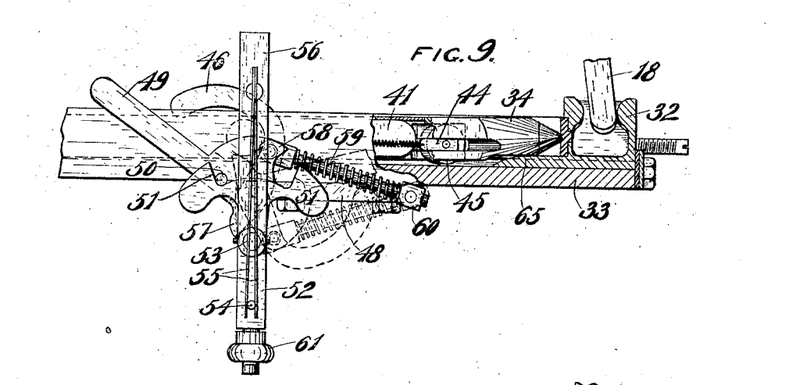
Fig. 9 is a rear view partly in section of one of the shuttle boxes, showing the bobbin reversing mechanism; and, Fig. 10 is a sectional detail view of the fluid pressure driving means for the picker stick.

The shuttle 34 has a central recess in which is pivotally mounted a bobbin holder 41 carrying the bobbin 42 and a guide eye 43, said bobbin holder having an extended end which is adapted to engage with the spring retracted swinging frame 44, Fig. 9, at either end of the shuttle in which the rollers 45 of the shuttle are journaled. In this manner the bobbin holder is locked in either of its operative positions and at the same time serves to shift the position of the rollers to cause them to stand at an oblique position with relation to the direction of travel of the shuttle, so that the shuttle will travel close to the reed.

Figure 7:
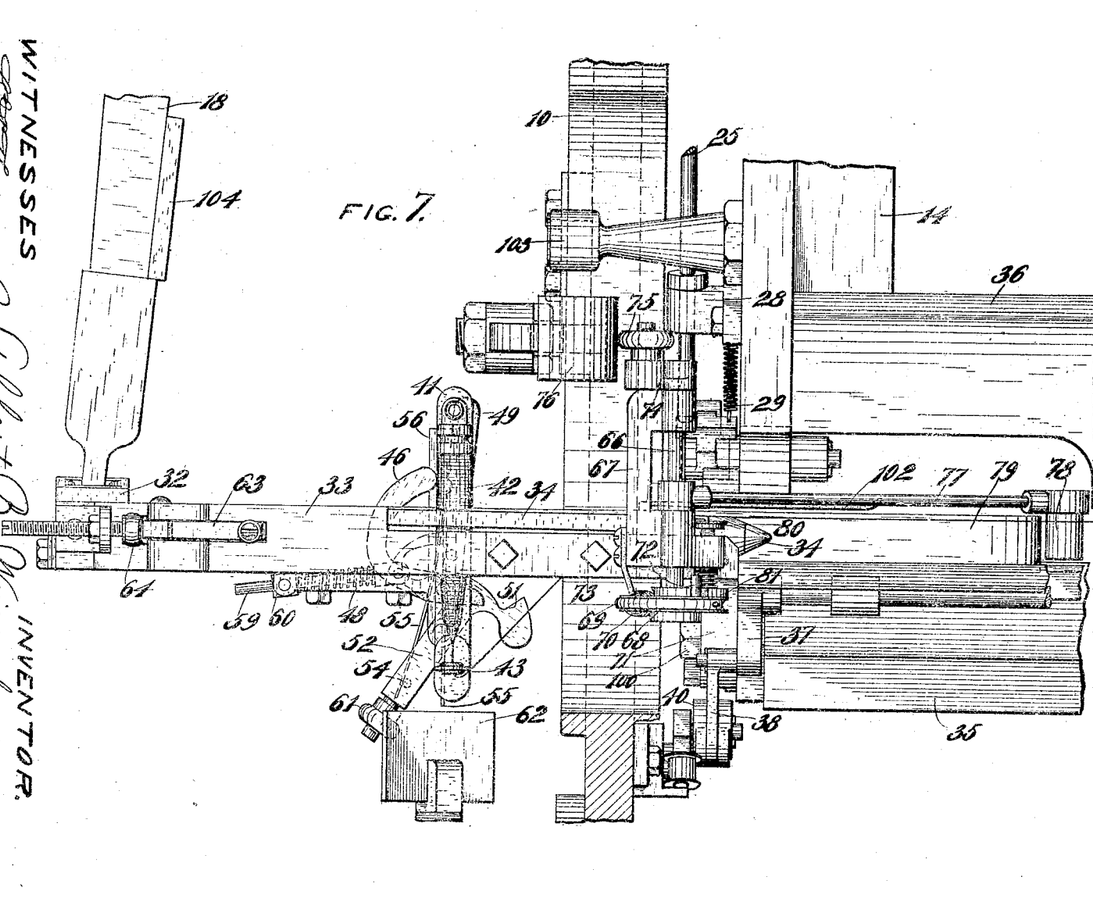
Fig. 7 is a front elevation of the parts at one end of the lay, showing the bobbin in the act of having its position reversed.
Figure 8:
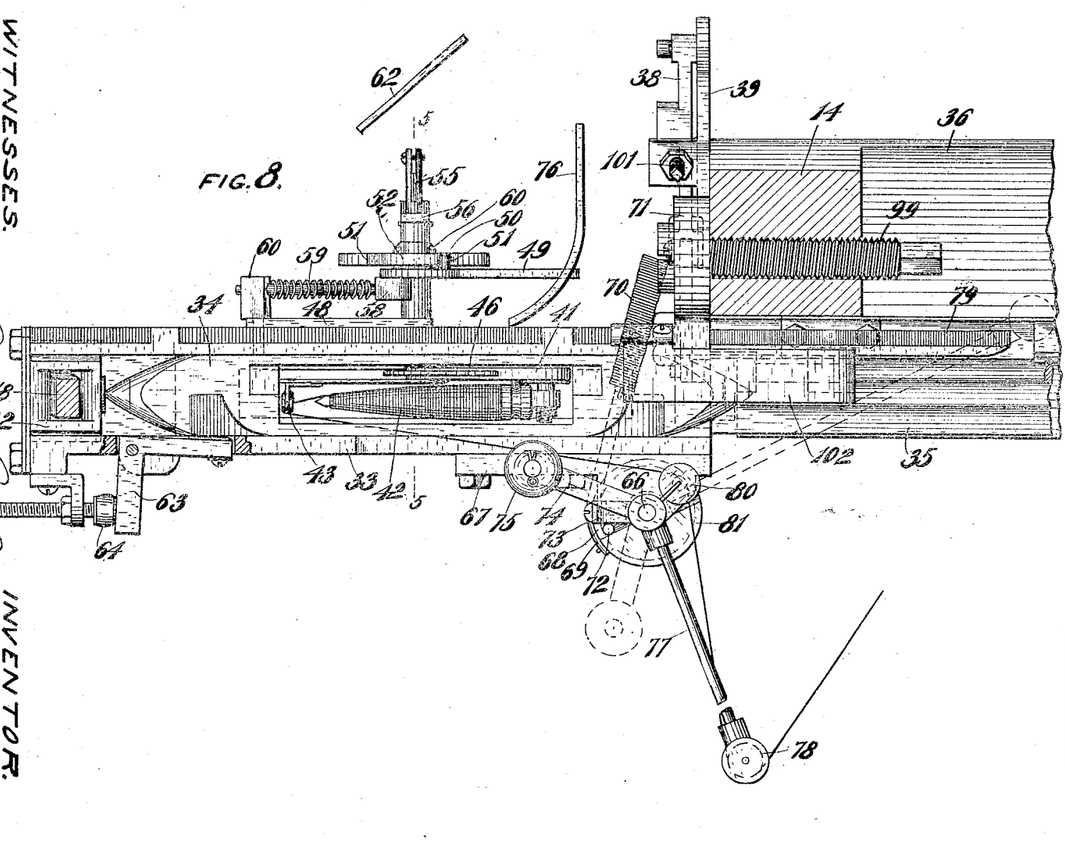
Fig. 8 is a plan view thereof showing the bobbin in its reversed position and the weft wire take up extended.

Automatic means is provided for swinging the bobbin holder from one position to the other when it arrives at either of the shuttle boxes to reverse the position of the bobbin so that the larger end thereof may always travel in advance. The means by which this swinging operation of the bobbin holder is performed comprises a curved finger 46, Figs. 5, 7, 8 and 9, mounted on a shaft 47 which is journaled in a bracket 48 beneath the shuttle box, said curved finger being adapted to travel through an opening in the bottom of the shuttle box and engage the bobbin holder as shown in Figs. 7 and 8 and carry it from one operative position to the other. The shaft 47 has fixed on it an arm 49 having a pin 50 projecting therefrom in the path of either of two lugs or shoulders 51 on a swinging frame 52 which is pivotally mounted on a pin 53 fixed to and projecting from the bracket 48. The swinging frame 52 is kept normally in an intermediate position by having a pin 54 projecting therefrom and held between a pair of leaf springs 55 which are carried by an arm 56 fixed on the projecting end of pin 53. When the swinging frame 52 is moved in either direction, such movement is resisted by one or the other of the springs 55 and it will be returned thereby to its normal intermediate position as soon as released. The arm 49 is provided with means for holding it with spring pressure in either of two positions as determined by the engagement of lugs 57 and 58 thereof with the hub portion of the swinging frame 52 where it is pivotally mounted on pin 53, such means as here shown comprising a spring pressed pin 59 pivoted to the lug 58 and slidably mounted in a pivotal stud 60. The movements of the arm 49 from one position to the other carries the pivotal connection of pin 59 past the line between stud 60 and the pin 53 so that said spring pressed pin forces the arm 49 with pressure into either of its positions and thereby accomplishes a quick throw of the curved finger 46 in throwing the bobbin holder from one position to the other or in returning it to its position beneath the shuttle, shown in dotted lines in Fig. 9. The movements of the swinging frame 52 to cause the throw of the arm 49 and curved finger 46 are produced by the engagement of a roller 61 on the lower end of said swinging frame which comes into engagement with either face of an obliquely disposed cam plate 62 adjustably mounted on the outside of the loom frame. As the lay approaches its position of dwell the rollers 61 at each end thereof strike against the front faces of the cam plates 62 at about the middle portion thereof and are forced thereby to swing inwardly to return the curved fingers 46 to their retracted positions beneath the shuttle boxes, and as the lay moves forwardly, after the throw of the shuttle, the rollers 61 meet with the rear faces of the cam plates 62, at about the middle portion thereof, and are forced thereby to swing outwardly to throw the curved fingers 46 upwardly, as clearly shown in Fig. 7. The bobbin is thereby reversed in its position at either end of the loom, the swinging frame 25 moving the arms 49 beyond the point of dead center and the spring pressed pin 59 completing the movement of the arm with a quick movement that snaps the bobbin holder into its new position where it changes the angular position of the roller of the shuttle and is in turn clamped in place by the spring pressure of the roller frame.

In order that the shuttle may not be moved by the pressure of the curved finger 46 thereon in reversing the bobbin holder a brake or clamp is provided which comprises an angular lever 63, Fig. 8, pivoted at the apex of the angle in the front wall of the shuttle box, one arm thereof passing through a slot of the shuttle box wall and provided with a friction shoe of leather or the like material to engage the end of the shuttle, while the other arm has an adjustable means 64 for applying pressure thereto, which may be in the form of a rubber spring, as shown, mounted on the end of the shuttle box. This clamping means serves to ease the end of the movement of the shuttle when it enters the shuttle box and also to clamp the shuttle in place until the picker stick is operated to eject it from the shuttle box. Without means for relieving the rollers of the shuttle at the outer end of the shuttle box from their engagement with the bottom of the shuttle box the clamping action of the brake 63 might in some cases interfere with the operation of reversing the bobbin, for it is necessary that the angular position of such roller be slightly changed in order that the bobbin holder may be released from the clamping action of the frame of the roller frame, and to avoid this result the picker block 32 is provided with a beveled projection 65, Fig. 9, extending in advance thereof which coöperates with the undercut portion at the end of the shuttle in slightly lifting the end of the shuttle and thereby freeing the roller at this end from engagement with the bottom of the shuttle box so that the roller offers no resistance to the disengagement of the bobbin holder from the roller frame 44. When the shuttle has reached the end of its throw the operation of reversing the position of the bobbin serves to take up a part of the slack of the weft wire left by the shuttle, but it is desirable to still further take up this slack and to draw the wire into its place before it is struck by the reed. A vertical shaft 66 is journaled in a bracket frame 67 on the front of the shuttle box near its inner end and carries a grooved disk 68 at its lower end to which is attached the end of a strap 69 whose other end connects with a coil spring 70 attached to the plate 71, by means of which the shuttle box is adjustably mounted on the end of the lay, the purpose of which spring being to give the shaft 66 a tendency to turn to the position in which it is shown in Fig. 8 where a stop pin 72 on the disk 68 engages with a projection 73 extending downwardly from bracket 67.

Figure 4:
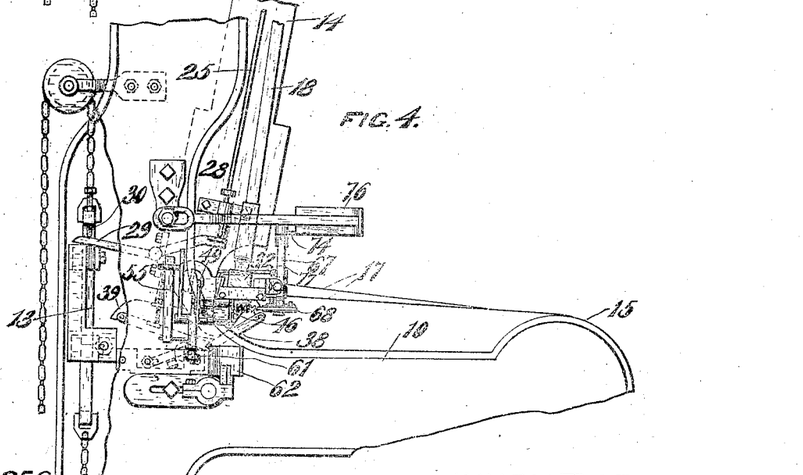
Fig. 4 is a view similar to Fig. 2 with the lay at the position of dwell.

A crank arm 74 fixed on the upper end of the shaft 66 carries a roller 75 to engage with a cam plate 76 in the path thereof and adjustably mounted on the outside of the loom frame, as shown in Fig. 4, so as to swing the shaft 66 and its parts to the position shown in dotted lines in Fig. 8. A take up arm 77 is also fixed on the shaft 66 and carries a downwardly extending roller 78 on its end which at the time the roller 75 is in engagement with the cam plate 76, as shown in Fig. 7, stands to the rear of the path of the shuttle, beyond the end of the rear guard plate 79 of the shuttle box and in position to engage the weft wire left by the shuttle so that as the lay swings forwardly and after the bobbin has been reversed the roller 75 by riding off of the cam plate 76 permits the spring 70 to turn the shaft 66 and swing the take up arm 77 forwardly and engage the weft wire with the roller 78 and draw it tight to the position shown in Fig. 8. In this movement the weft wire is drawn beneath the head of a spring pressed wire clamp 80 which is slidably mounted on the bracket 67 and is normally held elevated or open by a cam 81 on the disk 68 riding under the lower end thereof, but before the take up arm 77 has reached the end of its throw the cam 81 passes from beneath the clamp 80 and said clamp lowers upon the weft wire to hold it against slippage during the remainder of the movement of the take up arm, so as to give a slight tension to the weft wire during the remainder of the movement of the take up arm and the remainder of the movement of the lay before the weft wire is struck by the reed. On the return movement of the lay to the position of dwell the roller 75 is again engaged by the cam plate 76 to return the take up arm 77 to its position shown in dotted lines in Fig. 8, the loop of the weft wire having been dropped thereby to be taken up by the movement of the shuttle when it is thrown to the other side. The arm 49 forms a convenient means for permitting the curved finger 46 to be drawn by hand when desired, as for removing the shuttle to replenish the bobbin. The plate 102 appearing in Figs. 5, 7 and 8 is an upper guard plate for the shuttle box to keep the shuttle in its proper path.

In order to give tension to the warp wires and to feed the fabric on to the beam 16 as the work progresses, the warp beam 11 is provided with a ratchet wheel 82 engaged by a dog 83 which is pivotally mounted on a lever 84 fulcrumed on the loom frame, there also being a weighted lever 85 fulcrumed on the loom frame and connected with the lever 84 by means of a link 86. By means of these connections the weight of the lever is utilized to give the dog 83 the tendency to move upwardly and carry the warp beam with it in a direction to exert a force upon the warp wires to give them the desired tension. The lever 84 is also connected to a piston 87 which works in a cylinder 88 mounted on the floor, there being a valve 89 for admitting compressed air from a supply pipe 90 to the upper end of the cylinder through a pipe 91. The valve 89 has cords 92 connected therewith and extending to the front of the loom, one of which on being pulled serves to open the valve while the other serves to close the valve. When the valve is opened in this manner the compressed air forces the piston 87 downwardly and thereby counteracts the effect of the weight on lever 85 so as to lower the dog 83 and during a further movement of the piston downwardly a chain 93, which is connected with the end of the lever 84 and passes over a pulley 94 on the loom frame and then connects with the dog 83, causes said dog to swing away from the ratchet wheel so that the warp beam will be free to turn when the cloth beam 16 is turned to wind the fabric thereon. The cloth beam 16 is turned by means of a dog 95 mounted on a treadle 96, which dog engages the teeth of a ratchet wheel 97 on the beam 16 when the treadle is depressed, there being a pawl 98 engaging the ratchet wheel 97 to normally hold the beam 16 against turning. When the fabric has been fed onto the beam 16 to the desired extent the valve 89 is closed by pulling on the other cord 92 and at the time of closing the supply of compressed air to the cylinder it also opens an exhaust for the air contained in the cylinder so that the weight on lever 85 causes the parts to return to their former position, lifting the piston as well as engaging the dog 83 with the ratchet wheel 82 and turning the warp beam backwardly until the predetermined tension is given to the warp wires.

The operation of the several parts of the mechanism having been described specifically it need not be repeated, but briefly stated the shuttle throwing operation, the shuttling board swinging operation, the operation of reversing the bobbin and the take up operation are effected in the following order. Starting with the lay in the position of dwell, the shuttle having just been received in the shuttle box at one end and clamped in place by the clamping lever 63, and having its end lifted from the bottom of the shuttle box as described, the first effect produced is the throwing of the bobbin from one position to the other caused by the roller 61 engaging the rear face of cam plate 62, by so doing taking up a part of the slack of the weft wire left by the shuttle. Then the roller 75 rides off of the cam plate 76 and permits the spring to throw the take up arm and take up the slack in the weft wire and finally clamp the same beneath the head of clamp 80 so that a slight tension may be given thereto, and during this time the toggle links 38 have passed off of rollers 40 to permit the shuttling board 35 to drop out of its upper position so as to be out of the way when the block is struck by the reed. The further movement of the lay delivers the blow upon the weft wire and then a short return movement of the lay is succeeded by another forward movement thereof without its having come into a position where the mechanism of the present invention is brought into operative relation. The heddles are changed in the usual manner between the long beat and the short beat of the lay and then the lay is swung rearwardly to the position of dwell. On the rearward movement of the lay the take up arm 77 is returned to its normal position shown in dotted lines in Fig. 8 by the engagement of roller 75 with the cam plate 76, the shuttling board is raised to its operative position by the engagement of the toggle links 38 with the rollers 40, the curved finger 46 is retracted from the shuttle by the roller 61 riding over the front face of cam plate 62, and finally the trip arm 29 engages the trip pin 30 at that side of the loom at which the shuttle is then located so that said arm 29 is swung to open the valve 23 and admit compressed air to the cylinder 21 to swing the picker stick and throw the shuttle across the loom upon the shuttling board from which it is received on the other side where the cycle of operations above described is repeated.

Of course the operation of the various parts is performed simultaneously at both ends of the lay, with the exception of the opening of the air valve, which is only done at that end of the lay where the shuttle is located, and while these operations at the end of the lay from which the shuttle has just been thrown are mostly ineffective, they do no harm, and in fact one operation has its advantages by preventing an accidental throw of the picker stick at a time when no shuttle is in the shuttle box. Immediately after the throw of the picker stick at one end of the loom to drive the shuttle across the shuttling board the forward movement of the lay begins, and the rollers 61 are swung by engagement with the rear faces of the cam plates 62, the primary result being that the bobbin is reversed at one end of the loom, and incidentally the effect at the other end of the loom is to have the curved finger 46 rise behind the picker block which has thrown the shuttle and is returning slowly to its normal position, and so arrest the picker stick near the inner end of its movement so that if the lay should by accident be returned to the position of dwell after making the first stroke and without the change of the heddles the admission of compressed air to the cylinder of said picker stick will find the picker stick near the end of its stroke. It will therefore not be subjected to the severe strain of a forcible throw without the shuttle to resist it. This position of the curved finger 46, behind the picker stick, is shown in Fig. 5.

The present invention relieves the weaver of the necessity for drawing off the weft wire at each end of the loom so as to present it in proper position to receive the blow of the lay and furthermore dispense with the necessity for a weaver being located at each end of the loom for this purpose, enabling the loom to be operated by one man.

The reversing of the bobbin at each end of the throw of the shuttle has the advantage of causing the wire to be drawn off thereof in the same relative direction at all times and consequently the work is more uniformly done. This result is also contributed to by the automatic mechanical means for taking up the slack and give a slight tension to the weft wire for straightening it.

I desire it to be understood that this invention is not limited to any specific form or arrangement of parts except in so far as such limitations are specified in the claims.

What I claim as my invention is:

1. In a loom, a suitably operated lay, pressure operated picker means carried by the lay for throwing the shuttle back and forth, suitably operated heddle frames, and controlling means on the lay for the pressure operated picker means adapted to coöperate with the heddle frames whereby one picker means is operated in one position of the heddle frames and the other picker means is operated in the other position of the heddle frames.

2. In a loom, a suitably operated lay, a picker stick pivotally mounted at each end thereof, a pressure cylinder connected with each picker stick, valves for the pressure cylinders, trip levers controlling the valves, suitably shifted heddle frames, and trip pins movable with the heddle frames for engaging the trip levers of the respective ends of the lay in the different positions of the heddle frames.

3. In a loom, a lay, a picker stick pivotally mounted thereon, a pressure cylinder carried by the lay and connected with the picker stick, for causing the operation thereof, a spring seated valve for controlling the admission of pressure to the cylinder, a tubular valve stem on said valve having communication with the interior of the cylinder, a valve rod receiving the end of the valve stem and adapted in one position to be spaced from the upper end of the valve stem to permit the exhaust of the cylinder therethrough and in another position to close the end of the stem and to force the valve off of its seat, and means operated by the swing of the lay for causing the movement of the valve rod from one position to the other.

4. In a loom, a suitably operated lay, shuttle boxes carried thereby, a shuttle throwing means for the shuttle boxes, a shuttling board hinged to the lay and extending from one shuttle box to the other, and means operated by the movements of the lay for swinging the shuttling board into and out of position with relation to the shuttle boxes.

5. In a loom, a suitably operated lay, shuttle boxes carried thereby, a shuttle throwing means for the shuttle boxes, a shuttling board hinged to the lay and extending from one shuttle box to the other, a pair of toggle links connected to the shuttling board and to the lay, and a stationary yielding roller in the path of the toggle links to be engaged thereby for swinging the shuttling board into an operative position when the lay is in the position of dwell.

6. In a loom, a suitably operated lay, shuttle boxes adjustably mounted at the ends thereof, a shuttling board hinged to the lay and extending from one shuttle box to the other, toggle links connecting the shuttling board with the lay, a stationary part with which the toggle links engage during the movements of the lay for swinging the shuttling board, and a set screw between the lay and the toggle links for adjusting the operative position of the shuttling board to correspond with the adjustment of the shuttle boxes.

7. In a loom, a shuttle having a pivotally mounted bobbin holder by means of which the position of the bobbin may be reversed, shuttle boxes for receiving the shuttle at the ends of its travel, and automatic means at the shuttle boxes for swinging the bobbin holder of the shuttle to reverse the position of the bobbin.

8. In a loom, a shuttle having a pivotally mounted bobbin holder for reversing the position of the bobbin, a shuttle box in which the shuttle is received at each end of its travel, a swinging finger for engaging and throwing the bobbin holder to reverse the position of the bobbin, a spring pressed pin having connection with the swinging finger for holding it with pressure in either the position in which it stands out of the path of the shuttle or in which it is moved to throw the bobbin holder, a spring positioned swinging frame adapted to be swung in either direction from the position in which it is normally held by spring pressure, means connected with the swinging finger engaged by the swinging frame in either position of engagement with the swinging frame, and means for automatically swinging the swinging frame for causing the throw of the curved finger from one position to another.

9. In a loom, a suitably operated lay, a shuttle box at each end thereof, a shuttle adapted to travel from one shuttle box to the other and provided with a pivoted bobbin holder capable of swinging to reverse the position of the bobbin, a spring pressed swinging finger carried by each shuttle box, and means engaged by the swinging movement of the lay for throwing the swinging finger to reverse the bobbin when the lay swings in one direction and to withdraw the swinging finger from the shuttle when the lay swings in the other direction.

10. In a loom, a suitably operated lay, a shuttle box at each end thereof, a shuttle adapted to travel from one shuttle box to the other and having a movable bobbin holder for reversing the position of the bobbin, a swinging finger on each shuttle box for engaging and throwing the bobbin holder to reverse the position of the bobbin, a spring pressed pin having connection with the swinging finger for holding it with pressure in either the position in which it stands out of the path of the shuttle or in the position in which it is moved to throw the bobbin holder, a spring positioned swinging frame adapted to be swung in either direction from the position in which it is normally held by spring pressure, means connected with the swinging finger engaged by the swinging frame in either position of the swinging finger and having play between its positions of engagement with the swinging frame, a roller on the swinging frame, and a stationary cam plate to be engaged by the roller for causing the swinging finger to move in one direction when the lay is swinging forwardly and for causing the swinging finger to move in the opposite direction when the lay is swinging rearwardly.

11. In a loom, a shuttle having a swinging bobbin holder for reversing the position of the bobbin, means for swinging the bobbin holder, a shuttle box at each end of the travel of the shuttle, and a spring actuated brake shoe for clamping the shuttle in place in the shuttle box during the reversal of the bobbin holder.

12. In a loom, a shuttle having a swinging bobbin holder for reversing the position of the bobbin, means for swinging the bobbin holder, a shuttle box for receiving the shuttle at the ends of its travel, an angular lever pivotally mounted in the side wall of each of the shuttle boxes and having one arm extending within the shuttle box, and an adjustable spring engaging the other arm of the lever for causing the lever to engage the shuttle with pressure and clamp it in position during the reversal of the bobbin holder.

13. In a loom, a shuttle having a pivoted bobbin holder for reversing the position of the bobbin, means for swinging the bobbin holder, spring pressed swinging roller frames on the shuttle adapted to be swung by the bobbin holder and to hold the same in place, shuttle boxes to receive the shuttle at the ends of its travel, picker blocks traveling in the shuttle boxes, cam projections on the picker blocks on which the ends of the shuttle rides for lifting the shuttle so that the roller frames may be free to swing, and means for throwing the bobbin holder out of engagement with the roller frames.

14. In a loom, a suitably operated lay, a shuttle box at each end thereof, a shuttle adapted to be driven across the lay from one shuttle box to the other, a swinging take up arm positively moved by the movements of the lay for engaging the weft wire left by the shuttle and forming a loop therein to take up the play and to move it into position to be struck by the lay, and a clamp independent of the shuttle for engaging the wire at the shuttle end of the loop and preventing it from slipping while the take up arm gives tension to the weft wire.

15. In a loom, a suitably operated lay, shuttle boxes at the ends thereof, a shuttle adapted to be driven across the lay from one shuttle box to the other, a suitably journaled shaft at each end of the lay, means for giving a spring action thereto, a take up arm carried by the shaft, a crank arm also carried by the shaft, a roller on the crank arm, a stationary cam plate in the path of the roller to be engaged thereby for causing the shaft to swing against the action of the spring, and a roller carried by the take up arm to be carried by the movements of the shaft across the path of the shuttle to engage the weft wire left thereby and form a loop therein to straighten it and move it into position to receive the blow of the lay.

16. In a loom, a suitably operated lay, shuttle boxes at the ends thereof, a shuttle adapted to be driven across the lay from one shuttle box to the other, a suitably journaled shaft at each end of the lay, a disk carried thereby, a spring connected with the disk for giving the shaft a spring action, a stop for limiting the movement of the shaft, a take up arm carried by the shaft, a crank arm also carried by the shaft, a roller mounted on the crank arm, a stationary cam plate to be engaged by the roller for turning the shaft against the action of the spring, a roller carried by the take up arm to be moved across the path of the shuttle for engaging the weft wire left thereby and forming a loop therein to draw it into place, a spring pressed clamping member for engaging the shuttle end of the loop to permit the take up arm to give tension of the weft wire, and a cam carried by the disk for releasing the clamping member from the wire by the turning movement of the shaft.

In testimony whereof, I affix my signature, in presence of two witnesses.

ALBERT B. WEISSENBORN.

Witnesses:
ALBERT H. KRUGMEIER,
JESSIE KRUGMEIER.